United States Patent Office 3,438,934
Patented Apr. 15, 1969

3,438,934
SALICYLATE STABILIZED FLUORO-POLYMERS
Heinz F. Reinhardt, Claymont, Del., assignor to E. I. du Pont de Nemours and Company, Wilmington, Del., a corporation of Delaware
No Drawing. Filed Aug. 18, 1966, Ser. No. 573,176
Int. Cl. C08f 45/58, 45/60, 45/62
U.S. Cl. 260—45.75    8 Claims

ABSTRACT OF THE DISCLOSURE

Temperature stable fluoro-polymer compositions containing (1) a fluoro-polymer prepared by polymerizing at least 10 percent by weight of a fluoro-monomer and (2) a temperature stabilizing non-acidic salt of salicylic acid are provided for use in making coatings and molded articles.

---

This invention relates to fluoro-polymer compositions and more particularly to fluoro-polymer compositions that are stabilized against high temperature degradation.

There are many well known advantages in using fluoro-polymers where high resistance to weathering and chemical attack is desired. However, the resistant and durable nature of the polymers renders their application particularly difficult, often requiring the use of high temperature processing. For example, many fluoro-polymers are soluble in organic liquids only at elevated temperatures. Consequently, when the particular application requires that the polymer be deposited from solution, such as in preparing films and coatings, it is not only necessary to attain the solution temperature, but also the temperature must be high enough so that the solvent will evaporate. Frequently, temperatures on the order of 200° C. and above are employed. Similar high temperatures are required when it is desired to melt extrude or injection mold the polymer. However, at these high temperature processing conditions the fluoro-polymer degrades and becomes markedly discolored. Obviously, such degradation and discoloration is a severe disadvantage in many applications.

According to the present invention there is provided a fluoro-polymer composition that is effectively stabilized against high temperature degradation. The composition of this invention is prepared by adding to the fluoro-polymer an especially effective thermal stabilizer that prevents degradation and consequent discoloration of the fluoro-polymer. More particularly, the composition of this invention comprises a fluoro-polymer and in an amount sufficient to thermally stabilize the fluoro-polymer, a non-acidic salt of salicylic acid, the fluoro-polymer being prepared by the polymerization of at least 10 weight percent, based on the fluoro-polymer weight, of a fluoro-monomer.

The thermal stabilizers useful in the present invention are non-acidic salts of salicylic acid (i.e., salicylates). As used in this invention the term "non-acidic" includes those salts which do not react acid toward litmus paper in an aqueous medium. Beilstein, vol. 10, sets forth many salicylates which can be used in the present invention. In addition to non-acidity the salicylates in this invention should themselves be stable against decomposition over the temperature range of their use. Furthermore, for most applications, it is desirable that they be colorless (i.e., clear or white). However, if a pigmented fluoro-polymer composition is used, a colored non-acidic salicylate stabilizer can frequently be employed.

More particularly, the inexpensive and readily available salicylates of the Group I and II metals such as Li, Na, K, Mg, Ca, Sr, and Ba are preferred. However, other non-acidic salicylates such as the Pb, Zn, Sn and $NH_4$ salts can be used as well as non-acidic aluminum salicylates, such as $Na_2[(C_7H_4O_3)Al(OH)(H_2O)]$, and non-acidic bismuth salicylates. Mixtures and blends of non-acidic salicylates can also be employed. In particular, Ca- and Sr-salicylates are especially preferred.

The fluoro-polymers useful in the present invention include polymers and copolymers prepared by polymerizing fluoro-monomers as well as copolymers prepared by polymerizing a fluoro-monomer with one or more polymerizable monomers having no fluorine content. When the latter copolymers are prepared, and especially when the fluoro-monomer is itself relatively unstable (e.g., vinyl fluoride), an improvement in stability can be realized with as little as 10 weight percent fluoro-monomer content, based on the total polymer weight. On the other hand, when the fluoro-monomer is itself quite stable (e.g., vinylidene fluoride), a greater percent of the fluoro-monomer is generally necessary in the copolymer before an improvement in stability is evident. In general, a stability improvement is apparent with any polymer prepared by the polymerization of at least 25 weight percent fluoro-monomer.

As indicated above, the stabilizers of the present invention are especially useful with polymers and copolymers of vinyl fluoride. A variety of patents are available which disclose methods of preparing polyvinyl fluoride. Among others, such U.S. patents include: 2,419,008 and 2,419,010 both issued Apr. 15, 1947 to Coffman et al.; 2,510,783 issued June 6, 1950 to Johnson et al.; and 2,810,702 issued October 22, 1957 to Bechtold et al.

While any polymerization method can be used for preparing the polymer, the selection of a particular method is frequently influenced by the end use of the polymer. Thus, where the polymer is to be used as a coating it is generally desirable that the polymer particle size be small, uniform, and easily coalescible. To obtain a polymer having these characteristics an aqueous emulsion polymerization process can be employed. On the other hand, if the polymer is to be melt extruded or injection molded, dispersion polymerization techniques can frequently be used. Furthermore, it has been discovered that the method of polymer preparation can influence the thermal stability of polymer. Thus, an emulsion polymerization process can yield a fluoro-polymer possessing less thermal stability than the same polymer prepared by another method.

While the most pronounced improvement in stability is obtained with polymers wherein at least 10 weight percent of the starting monomer content is vinyl fluoride, an improvement is also obtained when other fluoro-monomers are used. The most common of these additional fluoro-monomers are those such as vinylidene fluoride, trifluorochloroethylene, difluorodichloroethylene, tetrafluoroethylene, and hexafluoropropylene. Mixtures of the above monomers with each other as well as with vinyl fluoride and other copolymerizable monomers are also useful. Reference is directed to the following U.S. patents: 2,435,537 issued Feb. 3, 1948 to Ford et al.; 2,468,664 issued Apr. 26, 1949 to Hanford et al.; 3,169,120 issued Feb. 9, 1965 to Capron et al.; and 3,253,060 issued May 24, 1966 to Koblitz et al. for disclosures of various methods that can be used for preparing many useful polymers.

When it is desired to polymerize the fluoro-monomer or monomers with a non-fluoro containing monomer or monomers a wide variety of the latter monomers can be used. U.S. Patent 2,419,009 issued on Apr. 15, 1947, to Coffman et al. discloses many non-fluoro containing monomers that can be polymerized with vinyl fluoride though it is to be understood that such polymerization will also occur with other fluoro-monomers as well. Among others, some of the more useful non-fluoro containing monomers are methyl methacrylate, vinyl acetate, isobutylene, methyl acrylate, methoxyethyl vinyl ether, methacrylic acid, acrylic acid, itaconic acid, and bis-β-chloroethyl vinyl phosphonate.

The non-acidic salicylate stabilizer is present in the composition of this invention in an amount sufficient to stabilize the polymer. Polymer stability is generally determined at the polymer processing or end use conditions and in general will vary according to the particular polymer employed. For example, as stated in British patent specification 950,674 to Pennsalt Chemicals Corporation, a vinylidene fluoride polymer may decompose and discolor when held at 270° C. for one hour. Thus, polymer stability, and the corresponding quantity of stabilizer needed, is determined under these conditions if the polymer processing or end use conditions subject the polymer to such a temperature.

On the other hand, some polyvinyl fluorides noticeably decompose at 200° C. after only 1½ minutes. Thus, for these polymers, the stability is usually tested under less severe conditions than the conditions for vinylidene fluoride. Additionally, the end use of the polymer may be such as to allow some degradation and discoloration. In such a case, the required polymer stability is not as great as when a clear film is desired and, correspondingly, a lesser amount of stabilizer is required to obtain the desired thermal stability.

A further factor influencing the stabilizer concentration in the composition is the solubility of the particular salicylate in the fluoro-polymer. When the salicylate is not very soluble in the polymer and the end use of the polymer is clear film, care must be taken to avoid using the salicylate in excess in order to prevent a cloudy, hazy appearance of the film. In general, the non-acidic salicylates of this invention are soluble in vinyl fluoride polymers and copolymers while comparatively insoluble in polymers prepared from other fluoro-monomers.

Of course, less salicylate is required as the percent of fluoro-monomer used in preparing the polymer is decreased. However, a useful salicylate concentration for most fluoropolymers is between about 0.05% and about 10% by weight, based on the polymer weight, while 0.1%–3% by weight is generally preferred.

A variety of methods can be used for formulating the composition of this invention. Where the fluoro-polymer is melt extruded in the form of a molded article, the thermal stabilizer can be blended with the fluoro-polymer prior to extruding. Such blending can generally be accomplished by using a conventional ball mill apparatus. On the other hand, where the fluoro-polymer is to be used as a coating and applied as a solution or particulate dispersion, the stabilizer is usually dissolved in the dispersing medium or solvent prior to application. In general, the non-acidic salicylates of this invention are soluble in most organic liquids at room temperature.

An additional method of preparing the invention composition comprises adding the stabilizer during the polymer polymerization stage. However, when the composition is so formulated, an excess of the stabilizer is generally added to compensate for that portion lost during the subsequent coagulation and separation steps.

When a coating is desired, the fluoro-polymer composition is generally applied to the surface in an organic liquid from which the fluoro-polymer coalesces on evaporation of the liquid. Some useful fluoro-polymers are soluble in common organic liquids, e.g., methyl ethyl ketone, benzene, toluene, at room temperature and thus can conveniently be applied as solutions. Other fluoro-polymers, e.g., polyvinyl fluoride, useful in this invention are insoluble in most organic liquids at room temperature and, consequently, are applied as dispersions.

The particular choice of a dispersing medium is governed by several factors including a sufficiently low viscosity to permit easy application of the dispersion and a boiling point low enough to allow its evaporation without decomposition of the polymer or stabilizer. While the polymers of some fluoro-polymer dispersions e.g., vinyl fluoride/vinyl acetate in hexane, will coalesce, on evaporation of the dispersing medium, at room or elevated temperatures without first going into solution, a great many must first be solubilized at an elevated temperature. In such a situation, the fluoro-polymer should be soluble in the dispersing medium at a temperature below its boiling point. Examples of useful organic liquid dispersing mediums include, among others, γ-butyrolactone, dimethylsulfonamide, dimethylacetamide, diethylsuccinate, triethylsuccinate, triethylphosphate, hexamethylphosphoramide, isophorone, and tetraethylurea. Blends of individual dispersing agents as well as blends of dispersing agents with diluents can also be used. Of course, depending on the particular application, other ingredients such as pigments and plasticizers can also be present in the dispersion.

Dispersions useful in this invention can also be prepared by adding the dispersing medium directly to the aqueous emulsion containing the polymerized fluoro-polymer. Since the water generally evaporates prior to either the solvating effect of the dispersing medium or its evaporation, satisfactory films and coatings can be obtained. Additionally, if stabilizer addition occurs during the polymerization process, there is no necessity for adding the aforementioned excess quantity of salicylate since water removal occurs by evaporation and there is little chance that appreciable amounts of stabilizer will be lost.

The following examples illustrate the present invention. All parts and percentages are on a weight basis unless otherwise indicated.

EXAMPLE 1

A fluoro-polymer is prepared by polymerizing 5 parts vinyl fluoride with 1 part methylmethacrylate. The polymerization is carried out in accordance with the two-stage process described in my copening U.S. patent application, Ser. No. 537,652, filed on Mar. 28, 1966, using a second stage temperature of 80° C. and a pressure of 2,000 p.s.i. A potassium persulfate/sodium metabisulfite redox catalyst is used with a "Duponol C" emulsifier. "Duponol C" is a registered trademark of E. I. du Pont de Nemours and Company and is described as being a sodium lauryl sulfate surfactant.

Subsequent to preparation, the fluoro-polymer is separated by filtration, washed with water, and rinsed with methanol. A dispersion is then prepared by adding twenty parts of the polymer to 80 parts of γ-butyrolactone to which 0.25 part of calcium salicylate has been added. The dispersion is then ball milled and cast with a 6 mil blade as a film on an "Alodine" aluminum substrate. Subsequently, the coated substrate is baked at 210° C. for 6 hours, 26 minutes after which time the film is observed for discoloration and appearance. As reported in Table I, the film prepared according to this example exhibits no discoloration and is glossy and clear in appearance.

EXAMPLES 2 AND 3

Examples 2 and 3 are carried out in a similar manner as is Example 1 except that the stabilizer in Example 2 is 0.02 part calcium salicylate while the stabilizer in Example 3 is 0.25 part strontium salicylate.

COMPARATIVE EXAMPLES A AND B

Comparative Examples A and B are carried out in a similar manner as is Example 1 except that the calcium salicylate addition is omitted in Comparative Example A while an addition of 0.25 part salicylic acid replaces the calcium salicylate addition in Comparative Example B.

Table I presents the observed discoloration and appearance of the films prepared according to the above examples.

TABLE I

["Alodine" aluminum substrate, 6 hours, 26 min. at 210° C.]

| Example | Additive | Discoloration | Appearance |
|---|---|---|---|
| 1 | 0.25 part Ca-salicylate | None | Glossy, clear. |
| 2 | 0.02 part Ca-salicylate | do | Do. |
| 3 | 0.25 part Sr-salicylate | do | Do. |
| Comp. A | None | Strong | Brown, yellow. |
| Comp. B | 0.25 part salicylic acid | do | Do. |

EXAMPLES 4–10

Examples 4–10 are carried out in a similar manner as is Example 1 except that different stabilizers, as indicated in Table II, are added and the dispersions are cast on a glass substrate and baked at 210° C. for 15 minutes.

COMPARATIVE EXAMPLE C

Comparative Example C is carried out in a similar manner as are Examples 4–10 except that no stabilizer is added.

Table II presents the observed discoloration and appearance of the films prepared according to Examples 4–10 and Comparative Example C.

TABLE II

[Glass substrate, 15 min. at 210° C.]

| Example | Additive (parts/20 parts polymer) | Discoloration | Appearance |
|---|---|---|---|
| 4 | 0.25 Ca-salicylate | None | Glossy, clear. |
| 5 | 0.25 Sr-salicylate | do | Do. |
| 6 | 0.25 Mg-salicylate | do | Do. |
| 7 | 0.25 Na-salicylate | do | Glossy, hazy. |
| 8 | 0.25 Ba-salicylate | do | Glossy, clear. |
| 9 | 0.25 Zn-salicylate | do | Do. |
| 10 | 0.25 Pb-salicylate | do | Do. |
| Comp. C | None | Strong | Brown. |

EXAMPLES 11–14

The polymers of Examples 11–14 are prepared by conventional aqueous emulsion polymerization techniques under the conditions set forth in Table III. A potassium persulfate/sodium metabisulfite redox catalyst is used in Examples 11–13 while a benzoyl peroxide catalyst in t-butanol is used in Example 14. The emulsions are buffered by the addition of $Na_2HPO_4 \cdot xH_2O$.

TABLE III

| Example | Fluoro-Polymer (starting monomer weight ratio) | Polymerization Conditions | | |
|---|---|---|---|---|
| | | Temp. (° C.) | Pressure (p.s.i.) | Time (Hrs.) |
| 11 | Polyvinyl fluoride | 85 | 2,000 | 11 |
| 12 | Vinylidene fluoride/methylmethacrylate (1/1). | 75 | 1,500 | 2 |
| 13 | Vinyl fluoride/vinyl chloride (1/2). | 80 | 1,500 | 2½ |
| 14 | Vinyl fluoride/chlorotrifluoroethylene/methyacrylic acid (4/1/.125). | 85 | 1,600 | 1 |

After preparation the polymers are separated, washed, dried and then added to the organic liquid indicated in Table IV. The fluoro-polymers of Examples 13 and 14 are soluble in methyl ethyl ketone at room temperature and thus form solutions while the fluoro-polymers of Examples 11 and 12 are present at room temperature, as dispersions in γ-butyrolactone. The stabilizer indicated in Table IV is then added to the solution or dispersion which is subsequently applied as a 6 mil coating on the designated substrate. Subsequently, the substrates are observed after having been heated at the indicated temperatures. The results of these observations as well as those for comparative examples using corresponding compositions without any stabilizer additions are reported in Table IV.

TABLE IV

| Example | Stabilizer (parts/100 parts polymer) | Substrate | Temp., ° C. | Time, Min. | Appearance |
|---|---|---|---|---|---|
| 11 (20% solids dispersion in γ-butyrolactone). | 0.5 Ca-salicylate | "Alodine" | 210 | 3 | Colorless. |
| Comp. D (same) | None | do | 210 | 3 | Brown. |
| 12 (15% solids dispersion in γ-butyrolactone). | 0.75 Sr-salicylate | do | 210 | 5 | Colorless. |
| Comp. E (same) | None | do | 210 | 5 | Yellow. |
| 13 (25% solids solution in methyl ethyl ketone). | 1.25 Ca-salicylate | Glass | 142 | 30 | Colorless. |
| Comp. F (same) | None | do | 142 | 30 | Yellow. |
| 14 (20% solids solution in methyl ethyl ketone). | 0.25 Ca-salicylate | "Alodine" | 210 | 4 | Colorless. |
| Comp. G (same) | None | do | 210 | 4 | Yellow. |

What is claimed is:

1. A novel composition comprising a fluoropolymer and a non-acidic salt of salicylic acid, said fluoropolymer prepared by polymerizing at least 10 weight percent of a fluoromonomer, based on weight of the fluoropolymer, and said non-acidic salt being selected from the group consisting of Li, Na, K, Mg, Ca, Sr, Pb, Zn, Sn, Al, Bi, $NH_4$, and Ba salicylates and wherein the salt is present in an amount of about 0.05–10 weight percent, based on the weight of the fluoropolymer.

2. The composition of claim 1 wherein the non-acidic salt is selected from the group consisting of Pb, Zn, Sn, Al, Bi and $NH_4$ salicylates.

3. The composition of claim 1 in an organic liquid, said liquid being such that, on its evaporation, the fluoropolymer coalesces therefrom.

4. The composition of claim 1 wherein the fluoropolymer is prepared by the polymerization of at least 10 weight percent vinyl fluoride and the basic salt is present in an amount of about 0.1–3 weight percent.

5. The composition of claim 4 wherein the fluoropolymer is a copolymer of methylmethacrylate and vinyl fluoride prepared by polymerizing at least 25 weight percent vinyl fluoride.

6. The composition of claim 4 wherein the fluoropolymer is polyvinyl fluoride.

7. The composition of claim 5 in an organic liquid with the non-acidic salt of salicylic acid being Ca-salicylate or Sr-salicylate and the liquid being such that, on its evaporation, the fluoro-polymer coalesces therefrom.

8. The composition of claim 6 in an organic liquid with the non-acidic salt of salicylic acid being Ca-salicylate or Sr-salicylate and the liquid being such that, on its evaporation, the fluoro-polymer coalesces therefrom.

References Cited

UNITED STATES PATENTS

| | | | |
|---|---|---|---|
| 2,965,595 | 12/1960 | Brinkler et al. | 260—29.6 |
| 3,081,208 | 3/1963 | Bottorf et al. | 260—92.1 |
| 3,169,120 | 1/1965 | Capron et al. | 260—92.1 |

DONALD E. CZAJA, Primary Examiner.

V. P. HOKE, Assistant Examiner.

U.S. Cl. X.R.

260—29.6, 30.4, 30.6, 31.8, 32.4, 32.6, 32.8, 92.1, 45.85